United States Patent [19]
Olbrich

[11] Patent Number: 5,503,043
[45] Date of Patent: Apr. 2, 1996

[54] TORSIONAL VIBRATION CANCELER

[75] Inventor: Andreas Olbrich, Mossautal, Germany

[73] Assignee: Firma Carl Freudenberg, Weinheim, Germany

[21] Appl. No.: 238,406

[22] Filed: May 5, 1994

[30] Foreign Application Priority Data

May 10, 1993 [DE] Germany ............ 43 15 483.2

[51] Int. Cl.[6] .................................................. F16F 15/10
[52] U.S. Cl. ................ 74/574; 74/572; 74/573 R; 464/89
[58] Field of Search .............................. 74/572, 573 R, 74/574; 464/89, 83, 180; 29/450

[56] References Cited

U.S. PATENT DOCUMENTS

| | | | |
|---|---|---|---|
| 5,186,077 | 2/1993 | Nakane | 464/89 X |
| 5,245,890 | 9/1993 | Honlinger et al. | 74/574 |
| 5,247,853 | 9/1993 | Dalebout | 74/573 R X |
| 5,328,408 | 7/1994 | Wolf et al. | 464/180 |
| 5,386,894 | 2/1995 | Barca | 74/574 X |
| 5,388,481 | 2/1995 | Andra | 74/572 |

FOREIGN PATENT DOCUMENTS

| | | | |
|---|---|---|---|
| 0021975 | 1/1981 | European Pat. Off. | 74/574 |
| 0551567 | 7/1993 | European Pat. Off. | 74/574 |
| 2629546 | 10/1989 | France | 74/574 |
| 2829253 | 1/1980 | Germany | 74/574 |
| 307921 | 10/1929 | United Kingdom | 74/572 |
| 492433 | 9/1938 | United Kingdom | 74/574 |

*Primary Examiner*—Vinh T. Luong
*Attorney, Agent, or Firm*—Kenyon & Kenyon

[57] ABSTRACT

A torsional vibration canceler for use on the outer periphery of a shaft which rotates about an axis and includes two enlargements. The torsional vibration canceler includes half-shells that can be pressed onto the outer periphery of the shaft and which are connected, by way of spring elements that can be deformed in the peripheral direction, to at least two inertial masses configured as segments of a circle. The inertial masses are connected to one another by a retaining elements, preferably in the form of at least one ring which surrounds the inertial masses radially and externally. The ring has an inside diameter which is greater than the diameter of at least the smallest of the enlargements.

10 Claims, 5 Drawing Sheets

TORSIONAL VIBRATION CANCELER

BACKGROUND OF THE INVENTION

1. Field of the Invention

The present invention relates to a torsional vibration canceler.

2. Description of Related Art

A torsional vibration canceler consisting of two half-shells has been produced by the applicant and is known. The half-shells of this device are pressed onto the outer periphery of the rotating shaft, and are connected to two inertial masses—configured as segments of a circle—by means of spring elements that can be deformed in the peripheral direction. In many vehicles, it is necessary to initially split the inertial masses and to then join the split masses to one another around the shaft, for ease of installation. This is generally because the shaft, for mounting purposes, has enlargements at both ends which are larger than the shaft diameter at the point where the canceler is to be fastened. The connection used to join the half-shells consists of two pins or screws located at the points where the half-shells touch one another. This type of connection for the two half-shells can be extremely costly due to the operations required to produce and assemble a canceler of this design. In addition, imbalance phenomena occur when the shaft rotates using a torsional vibration canceler of this design.

SUMMARY OF THE INVENTION

The object of the present invention is to provide a torsional vibration canceler that is economical to manufacture and easy to install.

In the torsional vibration canceler according to the invention, provision is made for the half-shell elements to be fastened by means of at least one ring which surrounds the inertial masses radially and externally, and for the ring to have an inside diameter which is greater than the diameter of at least the smallest of the enlargements on the shaft. This structure eliminates complex mechanical assembly processes of the inertial masses for additional pin or screw connections. Simple installation of the inertial masses is guaranteed. Unnecessary corrosion risk is prevented as a result of dirt deposition, for example, at the threaded or pin connections. The connection of the present invention is substantially less costly than conventional connections, and makes a substantial contribution to rotationally symmetrical motion of the shaft. To reduce dimensional inaccuracies, the ring can furthermore be pressed onto the inertial masses via a rubber coating. To achieve a wide resonance range, at least two rings can be fastened in the region of the ends of the inertial masses. A further possible embodiment provides that the ring surrounding the inertial masses is configured as a further inertial mass. This further inertial mass and the inertial masses of the torsional vibration canceler are connected in a torsionally elastic manner by means of a spacer layer made of rubber. The advantage of this embodiment is that it provides improved vibration damping of the rotating shaft. For easy installation and secure attachment, provision is made for configurations of the ring—for example a rectangular profile for the ring—such that the ring is shrunk onto the inertial masses. Another embodiment includes a ring delimited on the inside by a surface that in the axial direction ends in a skid shape at one end, and at the other end is provided with a delimiting stop. There is an advantageous effect from the possibility that the ring can expand flexibly in the radial direction and is completely parted at a peripheral point. With this embodiment the inertial masses can be connected with no need to slide the ring over the enlargement. All of these potential implementations make it possible to configure the rotating shaft in a rotationally symmetrical fashion and to keep its vibrations low, even in critical speed ranges.

The invention will be explained in more detail below, with the aid of the drawings which refer exemplary embodiments.

DETAILED DESCRIPTION OF THE DRAWINGS

Figure 1:
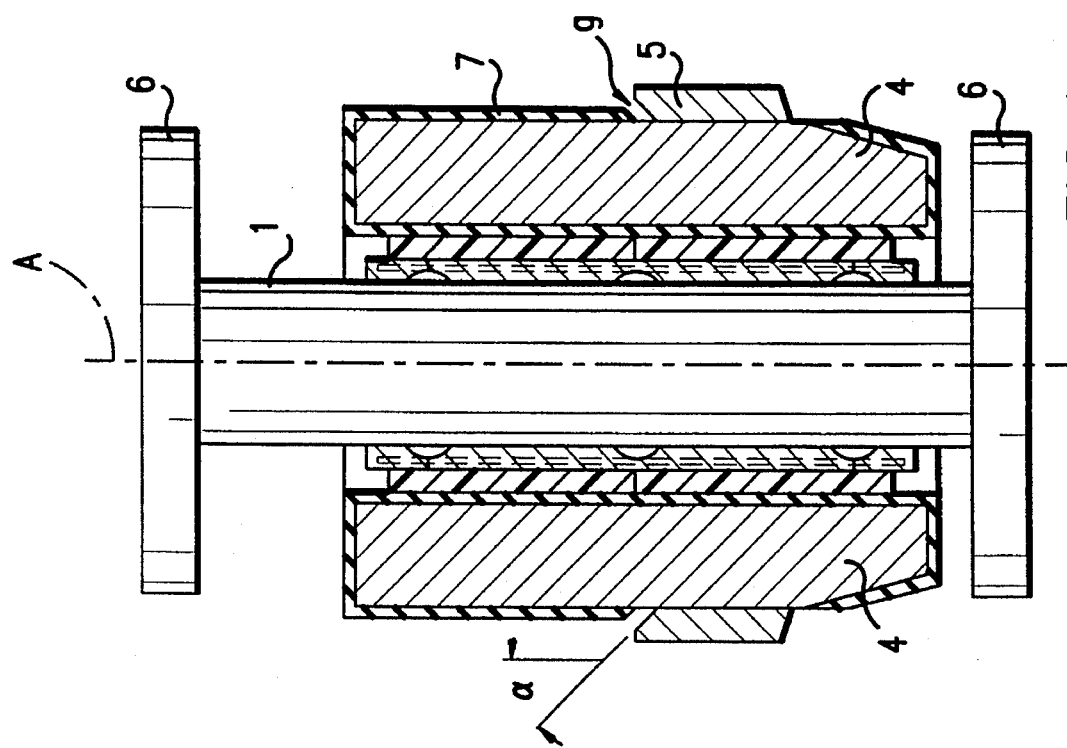
FIGS. 1 and 2 show sectioned depictions of a first embodiment of the torsional vibration canceler according to the present invention.
Figure 2:
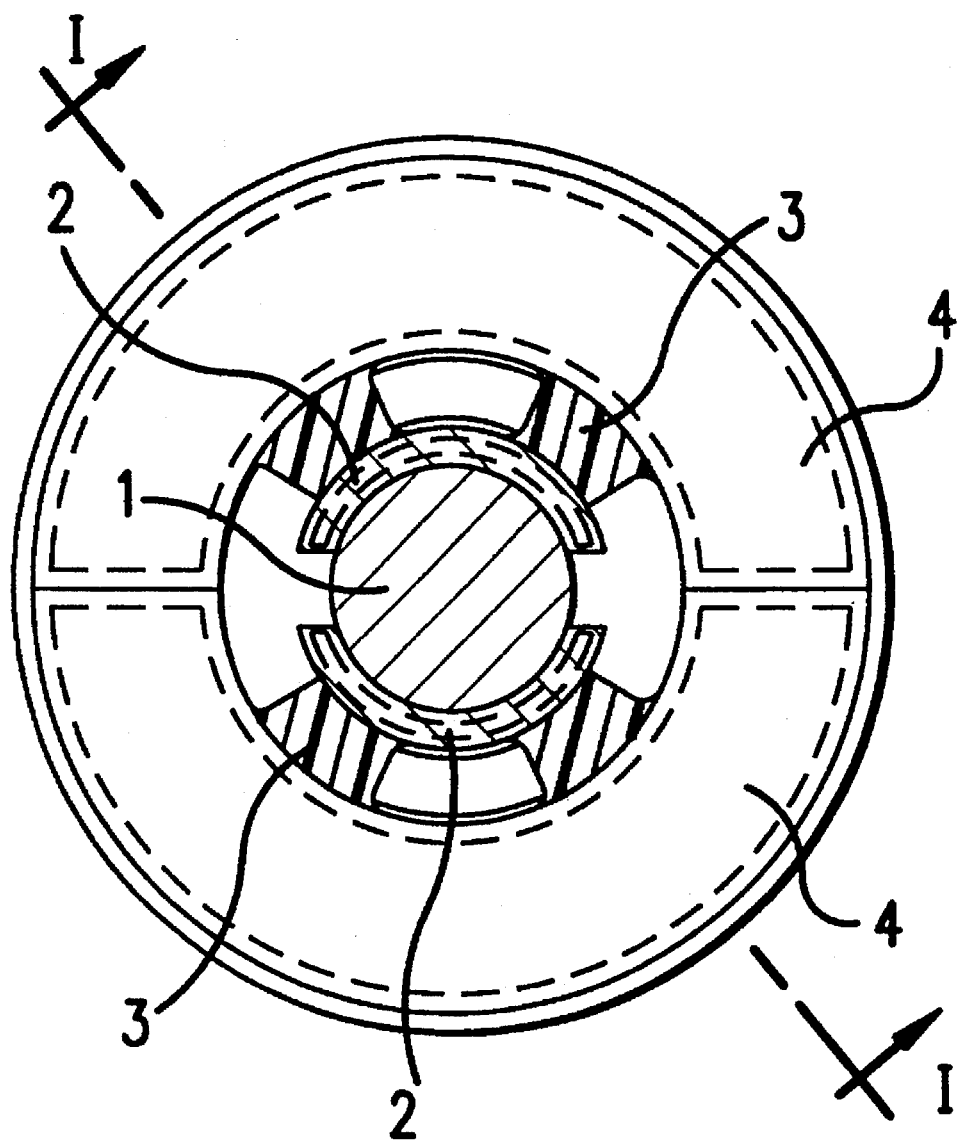

In FIGS. 1 and 2 a torsional vibration canceler is reproduced in lengthwise and transverse section. The torsional vibration canceler consists of two half-shells 2 which can be pressed onto the outer periphery of a rotating shaft 1 rotating about an axis A and are connected, by means of spring elements 3 which can deform peripherally—i.e., circumferentially—to two inertial masses 4 shaped like segments of a circle. These inertial masses 4 are connected by at least one retaining element. According to the present invention, the retaining element consists of at least one ring 5 enclosing the inertial masses 4. Note that ring 5 has an inside diameter which is greater than the diameter of at least the smallest of enlargements 6. Enlargements 6 constitute the mounts or attachments of shaft 1 to connect it to other components. Ring 5 can be coated with rubber (see FIG. 1)

Figure 1A:
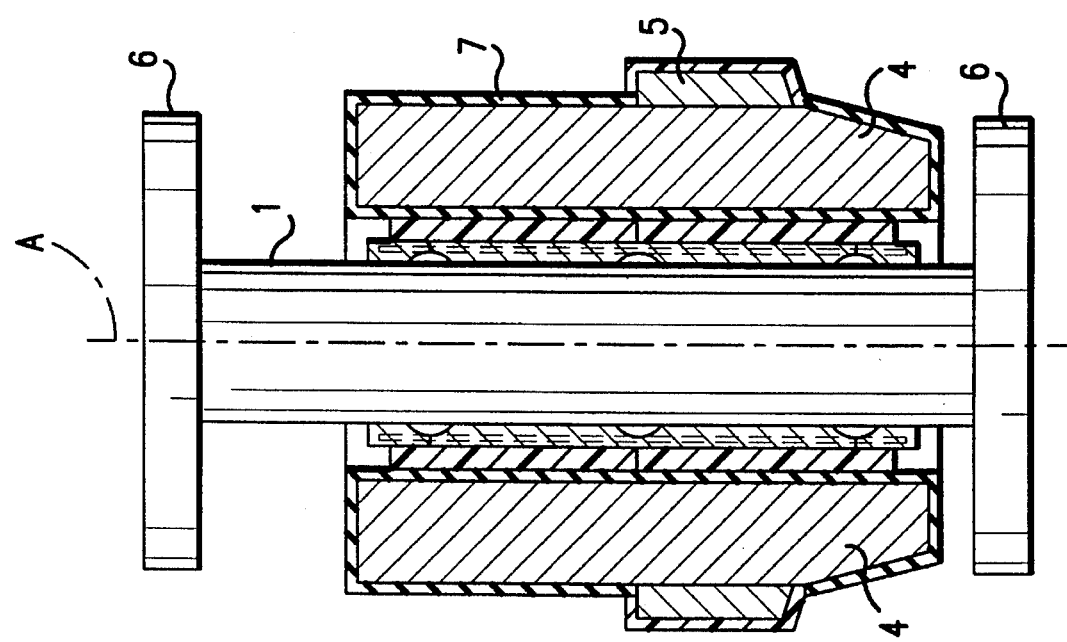
FIG. 1a is a cross-sectional view of an embodiment of the present invention including a skid surface on the ring.
Figure 1C:
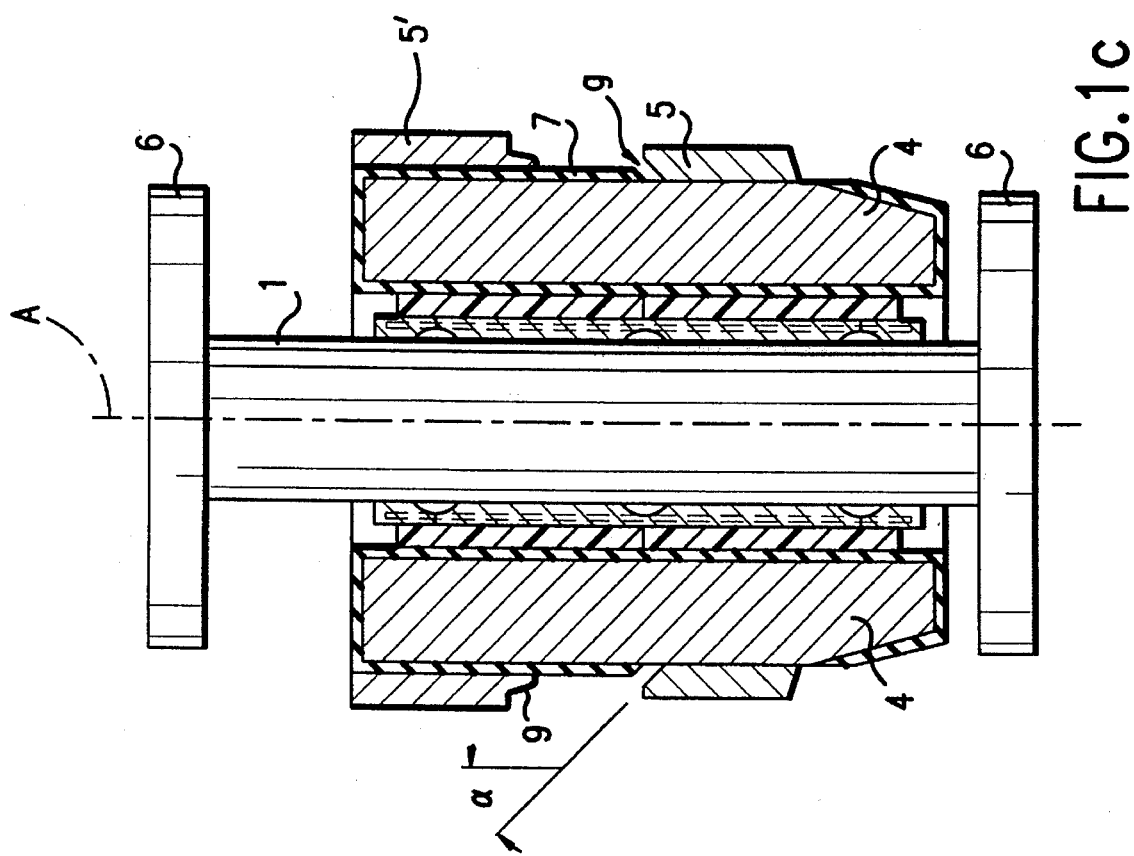
FIG. 1c is a cross-sectional view of an embodiment of the present invention including two rings.
Figure 1B:
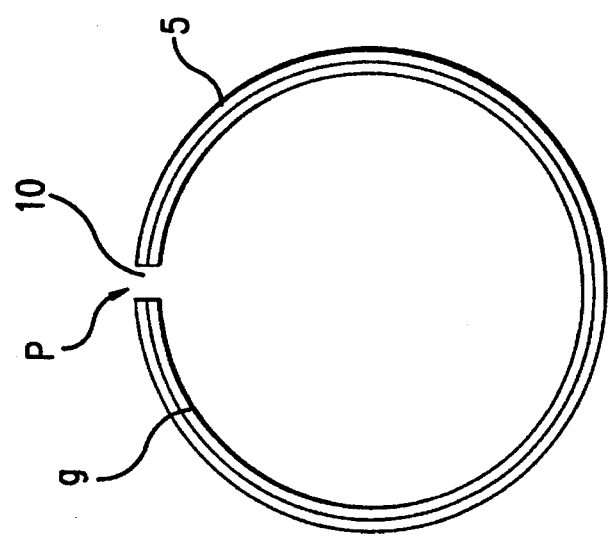
FIG. 1b is a top view of an embodiment of the ring of the present invention.

A further embodiment provides inertial masses 4 with an elastomeric or rubber covering 7 (shown in FIG. 1), with ring 5 being press or shrink fit onto the rubber covering. Another possible embodiment provides at least two rings 5 arranged and fastened in the region of the ends of inertial masses 4. Ring 5 according to FIG. 1a can both possess a rectangular cross-sectional shape and be delimited on the inside by a skid-shaped surface 9. Skid-shape surface 9 prevents damage to the elastomeric material 7 abutting ring 5 when ring 5 is inserted on the canceler during assembly. The skid-shaped surface 9 defines an angle a with the axis of rotation of the shaft 1. Angle $\alpha$ is preferably 30°, and should not exceed 45°. Ring 5 can furthermore be shrunk on or can expand flexibly in the radial direction and be completely parted at a circumferential point p. FIG. 1b shows a part 10 in ring 5 which allows the ring 5 to expand radially. Part 10 allows manufacture of ring 5 to be simplified, since tolerancing of the inside diameter of ring 5 is less critical. Ring 5 can be constructed of spring steel. FIG. 1c shows an embodiment wherein two rings, 5 and 5', are used to secure the inertial masses 4. The rings 5 and 5' are located at axial ends of the inertial masses 4.

Figure 3:
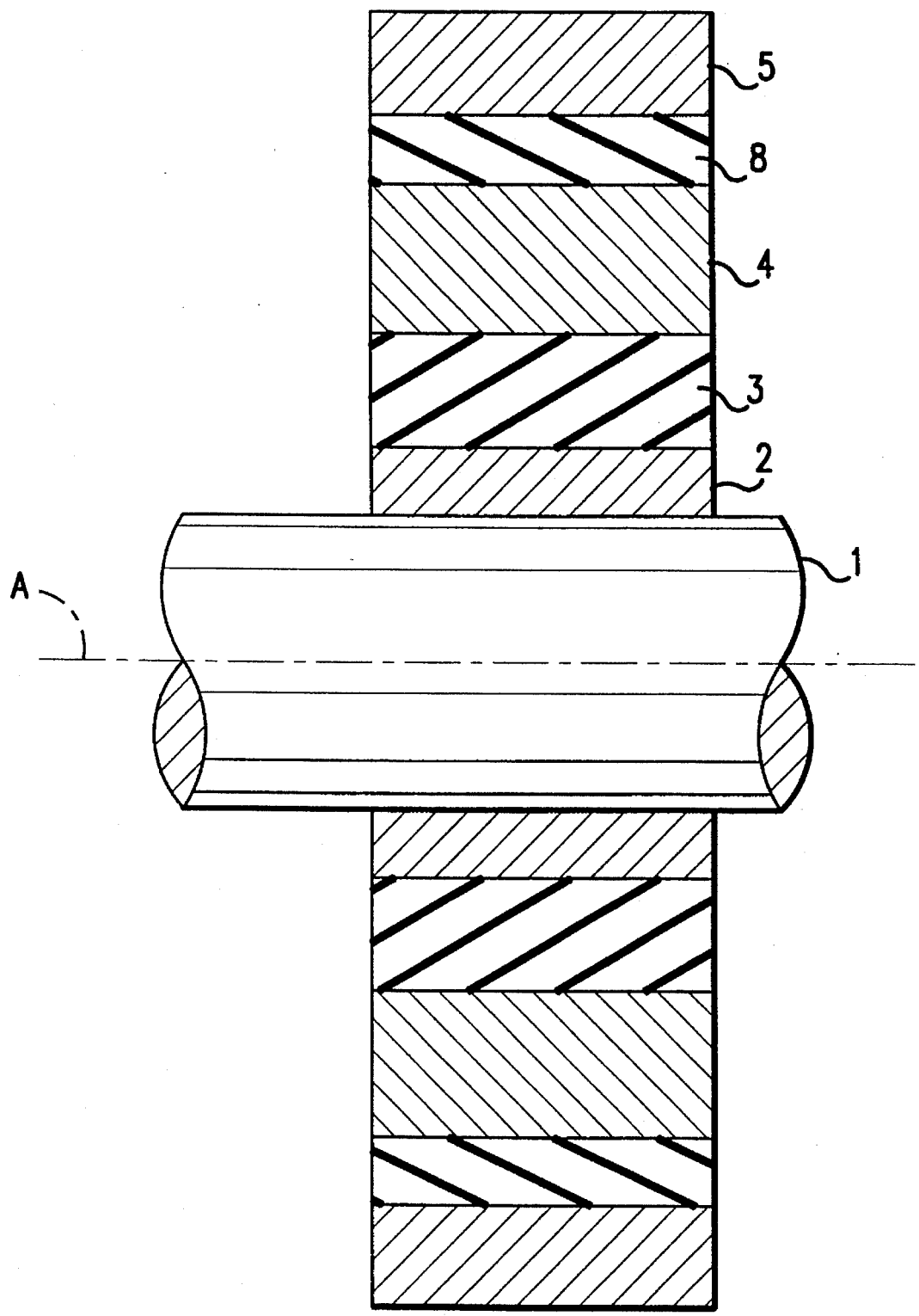
FIG. 3 shows an embodiment of the present invention.
Figure 3A:
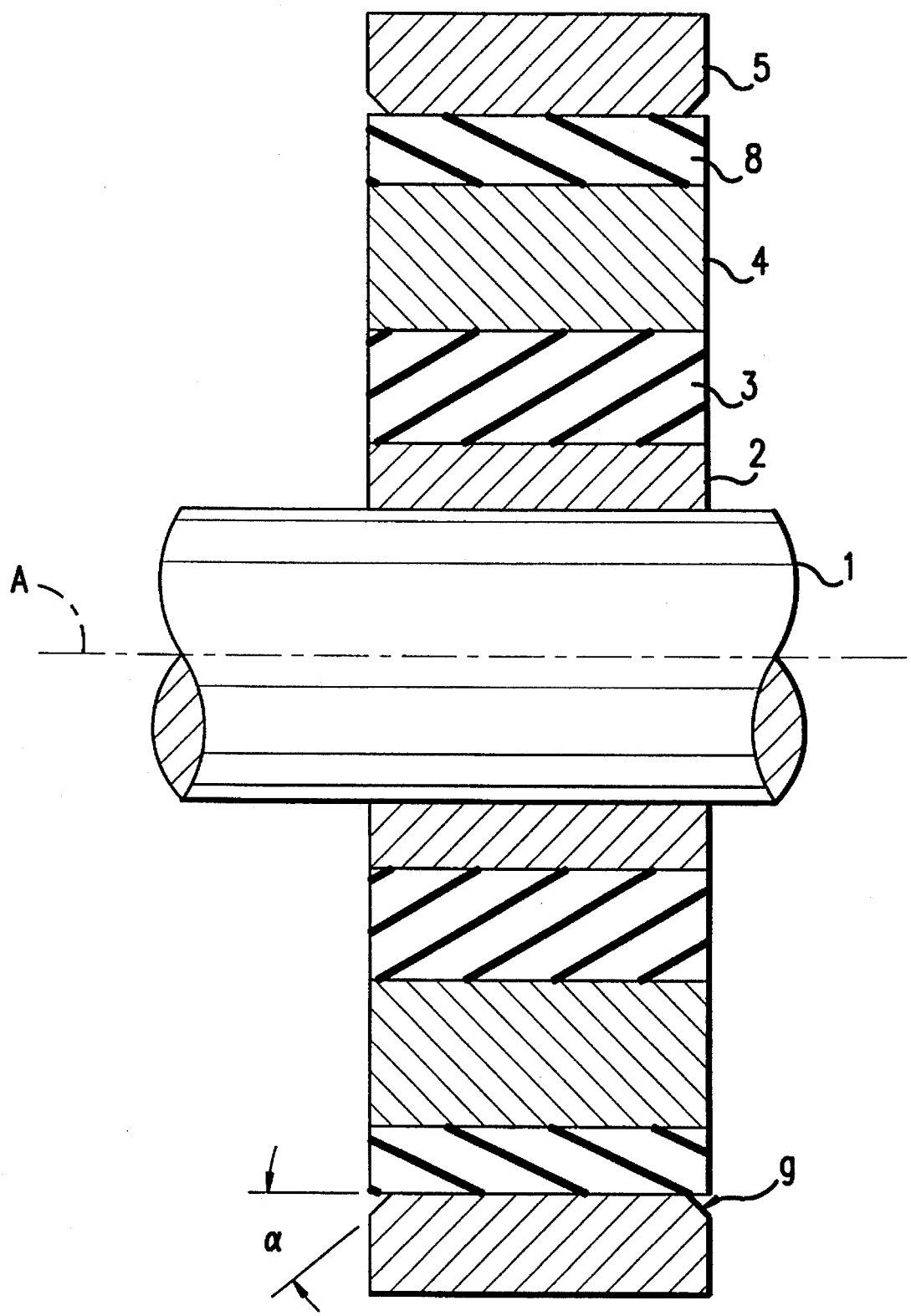
FIG. 3a shows the embodiment of FIG. 3 with the inclusion of a skid surface on the ring.

A further embodiment is shown in FIG. 3. In this embodiment, ring 5 is configured as a further inertial mass. This further inertial mass is connected in a torsionally elastic fashion to inertial masses 4 by means of a rubber spacer layer 8. FIG. 3a shows the device of FIG. 3 with the inclusion of a skid surface 9 on the ring 5.

The most essential advantages of the invention consist of simple installation of the inertial masses without additional mechanical processing of the parts, increased rotational symmetry of the rotating shaft, more economical production of a more secure connection of the inertial masses and thus of the entire torsional vibration canceler, and reduced risk of corrosion of the torsional vibration canceler.

I claim:

1. A torsional vibration canceler for use on an outer periphery of a shaft, which shaft rotates about an axis and comprises two enlargements, said torsional vibration canceler comprising:

at least two shells connected to the outer periphery of said shaft, said shells being connected, by circumferentially deformable spring elements, to at least two inertial masses, said inertial masses being connected to one another by at least one retaining element, said at least one retaining element comprising a ring which surrounds the inertial masses circumferentially, said ring having an inside diameter which is greater than an outside diameter of said enlargement having a smallest diameter.

2. The torsional vibration canceler of claim 1, wherein said ring is coated with rubber.

3. The torsional vibration canceler of claim 1, wherein said inertial masses are provided with a rubber coating, and wherein said ring is press fit onto said inertial masses.

4. The torsional vibration canceler of claim 1, further comprising a second retaining element, wherein said second retaining element comprises a second ring, said rings being located at axial ends of said inertial masses.

5. The torsional vibration canceler of claim 1, wherein said ring has a rectangular cross-section.

6. The torsional vibration canceler of claim 1, wherein said ring is configured as a further inertial mass.

7. The torsional vibration damper of claim 6, wherein said further inertial mass and said inertial masses are connected in a torsionally elastic fashion by a rubber spacer layer.

8. The torsional vibration damper of claim 1, wherein said ring is delimited by a surface which terminates axially in a skid shape.

9. The torsional vibration canceler of claim 1, wherein said ring is shrink fit onto said inertial masses.

10. The torsional vibration canceler of claim 1, wherein said ring is completely parted at a circumferential point, said ring being radially expandable.

* * * * *